Patented May 9, 1950

2,507,208

UNITED STATES PATENT OFFICE 2,507,208

COMPOSITIONS COMPRISING HALOGENATED CYCLO-DIENE QUINONE ADDUCTS

Julius Hyman, Chicago, Ill.

No Drawing. Application February 16, 1946,
Serial No. 648,205

4 Claims. (Cl. 167—30)

This invention relates to a new class of compositions of matter.

More specifically the present invention relates to a new class of halogenated organic chemical compounds, their method of production, their insecticidal activity, and their employment as insecticides.

I have found that a new and useful class of organic chemical compounds may be prepared by the halogenation of the Diels-Alder adducts of quinones with dienes.

The Diels-Alder diene synthesis (or, as frequently described more simply, the diene synthesis) is now so well established and understood in the field of organic chemistry that no detailed discussion of it will be given here. Suffice it to say that this synthesis consists of the 1,4-addition to a conjugated diene of double or triple bond. The unsaturated compound participating in the reaction with the diene is called a dienophile. The product of the reaction is called an adduct; and the reactants, the diene and dienophile, are referred to jointly as generators of the adduct, or simply as generators.

The reaction of quinones with conjugated dienes to form adducts was known before the nature of the reaction was understood. Actually, the reaction is an example of the Diels-Alder diene synthesis described above, and is now so understood. Methods of preparing the adducts of quinones with conjugated dienes are known to the art, and I make no claim to the products so produced.

What I have discovered, however, and what is new and useful in the art, is that adducts of quinones with dienes may be halogenated to produce new compositions of matter, and that these new compositions possess new and unexpected properties, which make them useful in agriculture and industry.

Halogenation of the quinone-diene adducts may be effected by addition or substitution or by a combination thereof. The method of halogenation employed will depend on the type of halogenation desired.

A common characteristic of my halogenated adducts of quinones and conjugated dienes is their insecticidal activity. This characteristic is particularly striking in view of the typically negligible potency of the un-halogenated adduct. A wide variety of quinones and conjugated dienes are available as starting materials for the preparation of the adducts which may then be halogenated according to the teachings of my invention to form the final insecticidally active compounds. Thus, among the quinones, there may be employed benzoquinone, toluquinone, a-naphthoquinone, and many others. Among the conjugated dienes, butadiene, isoprene, and cyclopentadiene, may be specifically mentioned although many others are available and may be used. In some cases, the quinones employed are capable of reacting with two molecules of the conjugated diene as, for example, in the case of benzoquinone which forms a diadduct with cyclopentadiene. Such quinone diadducts are starting materials for preparing the new compositions of my invention.

An example of the production of the new compositions of my invention is the preparation of the halogenated derivative of the diadduct of benzoquinone with cyclopentadiene. The diadduct itself may be prepared according to the method of Walter Albrecht, Ann. 348, 31–49 (1906). The halogenation of this compound is relatively simple and is described as follows:

Chlorine is introduced into a cooled, well-stirred suspension of 20 g. of p-benzoquinone-bis-cyclopentadiene adduct in 600 ml. of carbon tetrachloride at such a rate that the reaction temperature remains below 10° C. When the system no longer gains in weight introduction of chlorine is discontinued and the reaction flask is stoppered and left over night at about 0° C. Some hydrogen chloride is evolved during the chlorine treatment. The solvent is removed in vacuo leaving a light yellow solid product.

Obviously, quinone-diene Diels-Alder adducts may be halogenated with the other halogens, i. e., with bromine, iodine or fluorine, as well as with the chlorine shown in the foregoing example. The exact method of halogenation will depend in part on the halogen and on the particular type of halogenation desired. Such variations in procedure are well-known in organic chemistry synthesis and need not be described here.

As previously mentioned, a common characteristic of the halogenated adducts of my invention is their marked insecticidal activity, especially when compared with the activity, usually negligible, of the unhalogenated starting adduct. My new compositions of matter, therefore, lend themselves admirably to use as insecticides and as active ingredients in insecticidal compositions. In such insecticidal compositions they can be utilized, for example, with such carriers as talc or pyrophillite in agricultural dusts, with hydrocarbon or other suitable oils as oil sprays, with appropriate solvents and wetting and emulsifying agents as emulsion concentrate to be subsequently diluted with water and applied as aqueous emulsions, as aerosols, and in other types of formulations known to the insecticide art. They may be employed with other insecticides, if desired, and applied in any manner which will utilize their properties to best advantage.

To illustrate the insecticidal properties of the new compositions of my invention, tests were made against the common housefly by the standard Peet-Grady large group method employing the described chlorinated adduct of benzoquinone and cyclopentadiene. Since the Peet-Grady test procedure requires that the flies be knocked down rapidly, an appropriate amount of Lethane 384 Special (a commercially available organic thiocyanate) was added to the test solution as a knockdown agent. The test solution contained 1 gram of the chlorinated adduct and 1 ml. of Lethane 384 Special in 100 ml. of solution made up to volume with Deobase, a commercially available hydrocarbon oil. A 24-hour kill of 23 per cent was obtained. Comparative tests showed that the base oil and knockdown agent produced no appreciable kill under the conditions employed. Similar tests showed also that the insecticidal activity of the unchlorinated adduct was practically nil, thus providing striking evidence of the marked potency resulting from halogenation.

The examples and description given in the foregoing specification have been set forth for purposes of illustration, not limitation. It is intended that the broad principles of my invention be given the widest scope and interpretation, subject only to the limitation of the appended claims.

I claim as my invention:
1. The product obtained by chlorinating an adduct resulting from the addition of two mols of cyclopentadiene to one mol of benzoquinone dissolved in carbon tetrachloride at temperatures below 10° C. until the system no longer gains in weight.
2. An insecticidal composition comprising a compound of claim 1 and a powdered solid carrier.
3. An insecticidal composition comprising a compound of claim 1 dissolved in a hydrocarbon oil and an emulsifying agent.
4. An insecticidal composition comprising a compound of claim 1 dissolved in a hydrocarbon oil.

JULIUS HYMAN.

REFERENCES CITED

The following references are of record in the file of this patent:

UNITED STATES PATENTS

| Number | Name | Date |
|---|---|---|
| 1,967,862 | Carothers | July 4, 1934 |

OTHER REFERENCES

Annalen, 460, 98 (1928).
Diels, Berichte, 62, 2350 (1929).
Bockemuller, Annalen, 506, 35 (1933).